United States Patent
Elvis et al.

(10) Patent No.: US 7,966,168 B2
(45) Date of Patent: Jun. 21, 2011

(54) METHOD AND APPARATUS FOR SIZING A DRIVE UNIT FOR MULTIPLE APPLICATIONS WITH VARYING VOLTAGE REQUIREMENTS

(75) Inventors: Graham F. Elvis, Staffs (GB); Timothy J. Martin, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1008 days.

(21) Appl. No.: 11/094,373

(22) Filed: Mar. 30, 2005

(65) Prior Publication Data

US 2006/0238147 A1    Oct. 26, 2006

(51) Int. Cl.
*G06G 7/54* (2006.01)
*G06G 7/48* (2006.01)
(52) U.S. Cl. .................................. 703/18; 703/6; 703/7
(58) Field of Classification Search .................. 706/6, 7; 703/6, 7, 18
See application file for complete search history.

(56) References Cited

U.S. PATENT DOCUMENTS

| | | | |
|---|---|---|---|
| 4,092,571 A | 5/1978 | Hopkins et al. | |
| 4,809,803 A | 3/1989 | Ahern et al. | |
| 5,086,964 A | 2/1992 | Blaser | |
| 5,362,222 A | 11/1994 | Faig et al. | |
| 5,452,626 A * | 9/1995 | Denz | 74/665 L |
| 5,710,723 A | 1/1998 | Hoth et al. | |
| 6,034,458 A * | 3/2000 | Uetake et al. | 310/156.49 |
| 6,199,018 B1 | 3/2001 | Quist et al. | |
| 6,708,316 B2 * | 3/2004 | Madni et al. | 716/115 |
| 6,771,032 B2 | 8/2004 | Cox-Smith et al. | |
| 6,934,666 B2 * | 8/2005 | Saban et al. | 703/2 |
| 7,113,887 B2 | 9/2006 | Martin | |
| 7,394,632 B2 | 7/2008 | Arguello, Jr. et al. | |
| 2003/0074165 A1 * | 4/2003 | Saban et al. | 703/2 |

* cited by examiner

*Primary Examiner* — David Silver

(74) *Attorney, Agent, or Firm* — Quarles & Brady LLP; R. Scott Speroff; John M. Miller

(57) ABSTRACT

A method for sizing components of a motor control system powered by a power supply includes receiving an upper nominal line voltage parameter for the power supply. A lower nominal line voltage parameter for the power supply is received. A first performance measure of the motor control system is determined based on the upper nominal line voltage parameter. A second performance measure of the motor control system is determined based on the lower nominal line voltage parameter. Components suitable for use in the motor control system are identified based on at least the first and second performance measures.

20 Claims, 5 Drawing Sheets

METHOD AND APPARATUS FOR SIZING A DRIVE UNIT FOR MULTIPLE APPLICATIONS WITH VARYING VOLTAGE REQUIREMENTS

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to motion control systems, and, more particularly, to a method and apparatus for sizing a drive unit for multiple applications with varying voltage requirements.

Power plants are linked to power consuming facilities (e.g., buildings, factories, etc.) via utility grids designed so as to be extremely efficient in delivering large amounts of power. To facilitate efficient distribution, power is delivered over long distances as low frequency three-phase AC current. Despite being distributable efficiently, low frequency AC current is not suitable for end use in consuming facilities. Thus, prior to end use, power delivered by a utility is converted to a useable form. To this end, a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end-useable form (e.g., three phase, relatively high frequency AC voltage). A controller controls the inverter in a manner calculated to provide voltage waveforms required by the consuming facility.

Motors and linked loads are one type of common inductive load employed at many consuming facilities. To drive a motor an inverter includes a plurality of switches that can be controlled to link and delink the positive and negative DC buses to motor supply lines. The linking-delinking sequence causes voltage pulses on the motor supply lines that together define alternating voltage waveforms. When controlled correctly, the waveforms cooperate to generate a rotating magnetic field inside a motor stator core. In an induction motor, the magnetic field induces a field in motor rotor windings. The rotor field is attracted to the rotating stator field and thus the rotor rotates within the stator core. In a permanent magnet motor, one or more magnets on the rotor are attracted to the rotating magnetic field.

The amplifier, inverter, and control circuitry are commonly referred to as a motor drive unit. The motor drive unit, motor, and a possible gearbox coupled between the motor and its associated load are commonly referred to as a motion control system.

When a developer designs a motion control system, the requirements of the system (e.g., torque, power requirements) are defined. Subsequently, motion analyzer software is employed to identify specific motor drive products suitable for the design. In specifying the voltage requirements, the designer typically defines a nominal line voltage and an associated tolerance. Based on the system requirements and the specified nominal voltage with tolerances, the motion analyzer determines performance parameters for the application and matches these parameters against a database of drive products to identify those drive products that can meet the performance parameters.

For example, when a motor is deactivated, power created by the motor during a braking operation is either fed back to the DC bus as regenerative power or dissipated in a shunt. The motion analyzer considers the high voltage (i.e., nominal voltage plus the tolerance) to determine the required shunt or regenerative capacity for the system. The motion analyzer also considers the low voltage (i.e., nominal voltage minus the tolerance) to determine the velocity performance of the motor when delivering power to the load. A lower line voltage reduces the regenerative power dissipation, but also limits velocity performance. Hence, the motion analyzer considers the high and low voltages specified for the nominal voltage to identify suitable components for the application.

The complexity of the process for specifying application requirements and identifying suitable components is made more complicated in the case of a developer designing a system that may be employed in different locations. For example, one system may be installed in the United States where the line voltage for a three-phase system is commonly 220V, 460V, or 480V, while another identical system may be installed in Europe, where the line voltage for a three-phase system may be 380V, 400V, or 415V. Similarly, single phase line voltages vary across the world. To ensure that a design is suitable for both applications, the developer typically performs two different motion analyzer studies, one at each nominal line voltage (e.g., 480V and 415V). These two studies are then manually compared to identify components that meet the requirements for both applications. Compromises or reduced specification requirements may need to be made to arrive at a design suitable for both applications. This comparison/compromise approach is iterative and time consuming. Moreover, a designer may develop the system for one application without realizing the differing nominal line voltage for a different application. When the motion control system is installed in the application with the different nominal line voltage, a failure may occur.

Hence, it is desirable to provide a motional analyzer system capable of considering multiple applications with differing nominal line voltages, so that the drive products identified are suitable for either application.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

The present inventors have recognized that a motional analyzer system may be configured to receive upper and lower multiple nominal line voltage parameters and identify drive components suitable for either nominal line voltage application.

One aspect of the present invention is seen in a method for sizing components of a motor control system powered by a power supply. The method includes receiving an upper nominal line voltage parameter for the power supply. A lower nominal line voltage parameter for the power supply is received. A first performance measure of the motor control system is determined based on the upper nominal line voltage parameter. A second performance measure of the motor control system is determined based on the lower nominal line voltage parameter. Components suitable for use in the motor control system are identified based on the at least the first and second performance measures.

Another aspect of the present invention is seen in a program storage device programmed with instructions that, when executed by a processing device, implement the method.

Yet another aspect of the present invention is seen in a sizing tool for sizing components of a motor control system powered by a power supply. The sizing tool includes a component database, an application requirements interface, and a motion analyzer engine. The application requirements interface includes a first field specifying an upper nominal line voltage parameter for the power supply and a second field specifying a lower nominal line voltage parameter for the power supply. The motion analyzer engine is operable to determine a first performance measure of the motor control system based on the upper nominal line voltage parameter, determine a second performance measure of the motor control system based on the lower nominal line voltage parameter, and identify components in the component database suitable for use in the motor control system based on at least the first and second performance measures.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
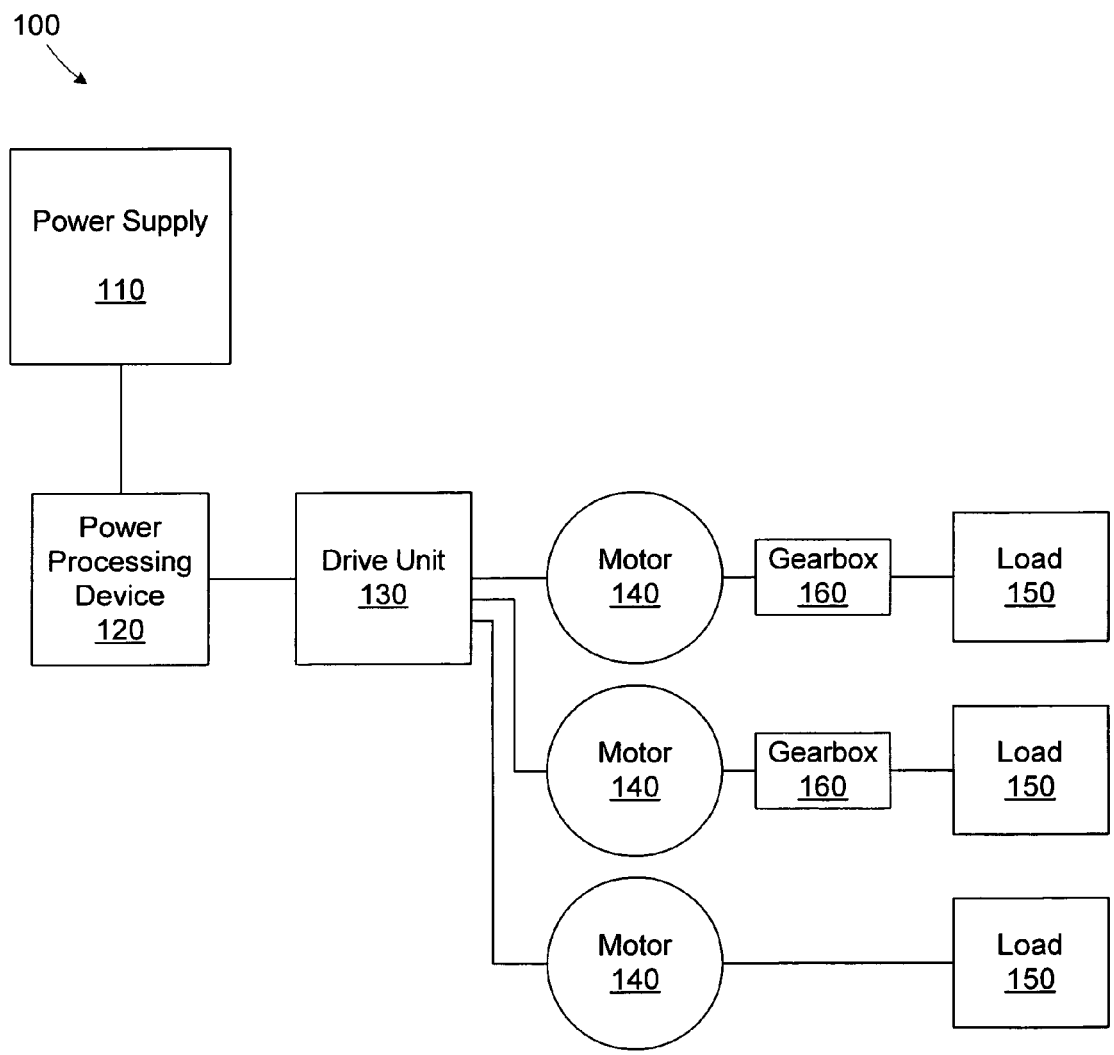
FIG. 1 is a diagram illustrating a motor control system design.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of a motor control system 100. The diagram of the motor control system 100 represents a system design, rather than an actual hardware installation. The motor control system 100 includes a power supply 110, a power processing device 120, and one or more drive units 130 for driving associated motors 140 and loads 150. In some instances, a gearbox 160 may be disposed between the motor 140 and its associated load 150.

The power supply 110 typically provides an AC voltage received from a utility grid. The nominal line voltage of the power supply 110 may vary depending on the location at which the motor control system 100 is intended to be installed. For instance, line voltages for a system in the United States may be selected from 220V, 460V, or 480V for three phase or 115V or 220V for single phase. Line voltages in Europe may be selected from 230, 380V, 400V, or 415V for three phase or 110, 220, 230, or 240 for single phase. A single phase line voltage of 90V is sometimes used in the Far East. A designer may wish to implement the motor control system 100 in multiple locations with differing nominal line voltage power supplies 110.

The power processing device 120 performs various functions, such as power conversion, switching, protection, filtering, etc. A commercially available power processing device 120 capable of performing the described power conditioning and protection functions is a line interface module (LIM) offered by Rockwell Automation, Inc. of Milwaukee, Wis. Exemplary line interface modules include models 2094-AL09, 2094-AL75S, 2094-BL02, 2094-BL75S, and 2094-XL75S-Cx.

The drive units 130 generate voltages for powering the motors 140 and their associated loads 150 (i.e., each referred to as an axis). A particular drive unit 130 may serve multiple axes or a single axis. The construction and operation of drive units 130 for performing this function are well known to those of ordinary skill in the art. Exemplary drive units 130 are drives in the Kinetix 6000 drive family offered commercially by Rockwell Automation, Inc. In general, the drive units 130 produce positive and negative voltage pulses in specific sequences to generate AC voltages having controllable amplitudes and frequencies for the associated motors 140.

Figure 2:
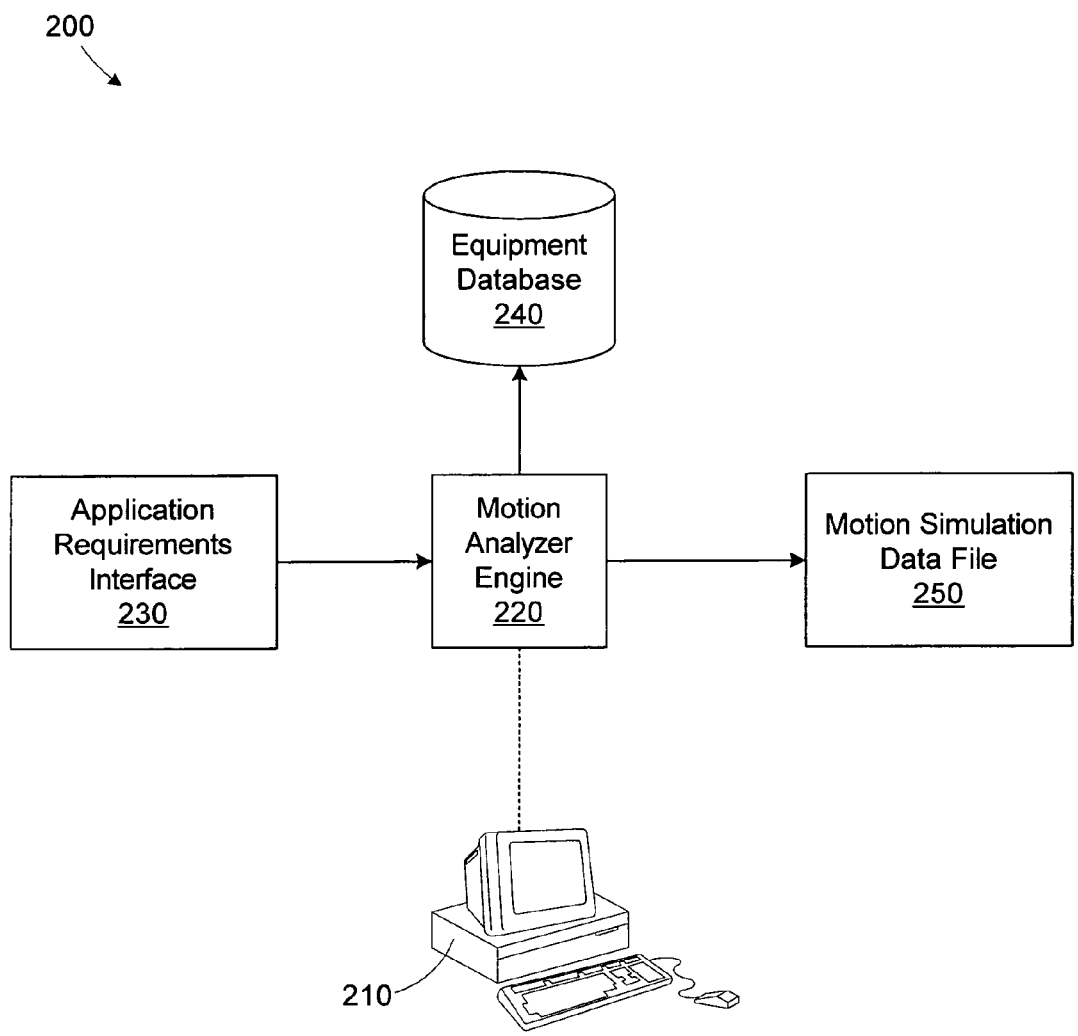
FIG. 2 is a simplified block diagram of a sizing tool in accordance with one illustrative embodiment of the present invention for determining requirements for the motor control system of FIG. 1.

Turning now to FIG. 2, a simplified block diagram of a sizing tool 200 for identifying components suitable for use in the motor control system 100 of FIG. 1 is provided. The sizing tool 200 is implemented by software executing on a general-purpose or specialized processing device 210 (e.g., a desktop computer, notebook computer, or workstation). The sizing tool 200 includes a motion analyzer engine 220, an application requirements interface 230, and an equipment database 240. Motion analyzers are known to those of ordinary skill in the art. An exemplary motion analysis tool is Motion Analyzer, Version 4.0, offered by Rockwell Automation, Inc. A user specifies information regarding the motor control system 100 through the application requirements interface 230. As will be described in greater detail below in reference to FIG. 3, the user may specify multiple nominal line voltages for the motor control system 100. The motion analyzer engine 220 uses information regarding the drive unit 130 and its associated motor/load axes to determine operating characteristics (e.g., torque, power requirements, etc.) for the drive unit 130 and generates a motion simulation data file 250.

Based on the determined operating characteristics, the motion analyzer engine 220 searches the equipment database 240 to identify components of the motor control system 100 suitable for the design. As is known in the art, the motion analyzer engine 220 may suggest multiple compositions (i.e., using different components) for the motor control system 100 and generate operating profiles for each such composition. The user may then evaluate the different suggestions to select the arrangement best meeting the designer's performance goals. The different suggested compositions and their associated performance and operating characteristics are stored in the motion simulation data file 250.

Figure 3:
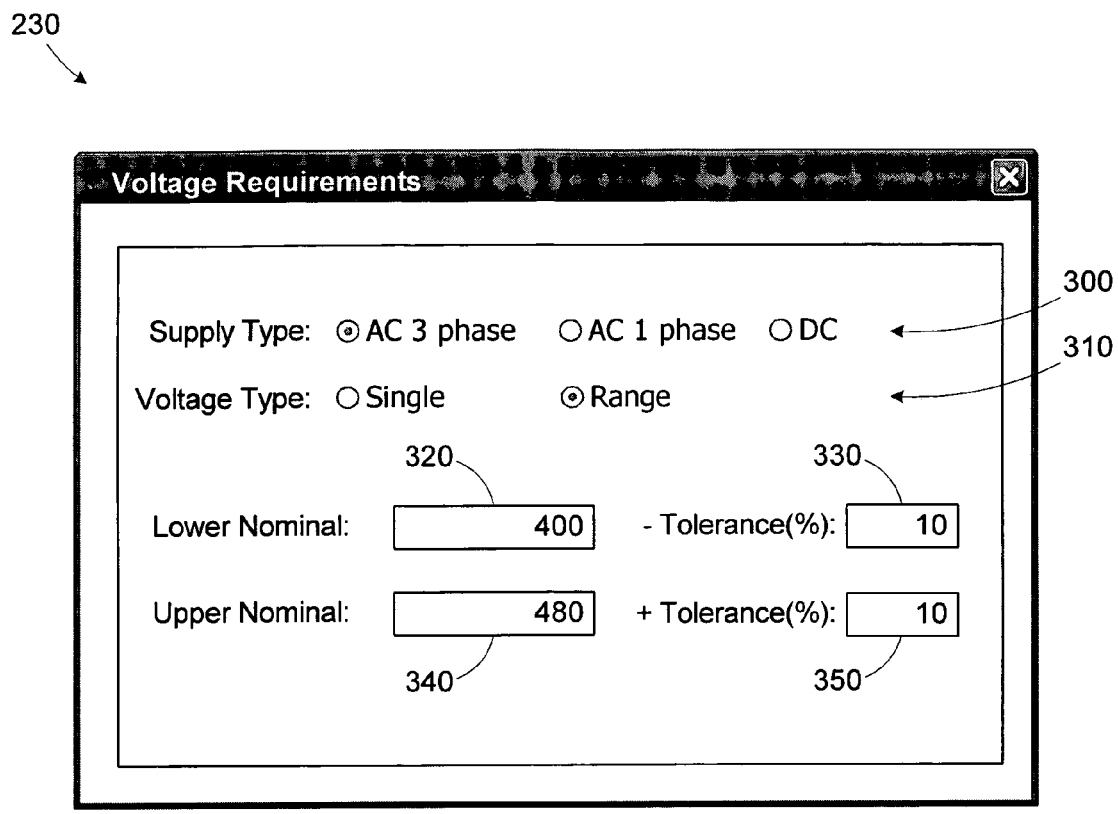
FIG. 3 is a diagram of an application requirements interface used in the sizing tool of FIG. 2.

Turning now to FIG. 3 a diagram illustrating the application requirements interface 230 is provided. In FIG. 3, only the portion of the interface relating to line voltage specification is shown. As will be appreciated by those of ordinary skill in the art, many requirements are specified in defining the characteristics of the motor control system 100. An exemplary, but not exhaustive, list, of parameters specified for the system includes RMS torque, peak torque, RMS velocity, peak velocity, reflected inertia (min), reflected inertia (max), average current, peak current, winding temperature, minimum inertia ratio, maximum inertia ratio, motoring peak power, motoring average power, regenerative peak power, and regenerative average power. The specification of these parameters is well known to those of ordinary skill in the art, so they are not described in detail here in the interests of simplifying the description.

Still referring to FIG. 3, the application requirements interface 230 includes supply type radio buttons 300, voltage type radio buttons 310, a lower nominal voltage field 320, a lower tolerance field 330, an upper nominal voltage field 340, and an upper tolerance field 350. The user chooses one of the supply type radio buttons 300 to select an AC 3 phase, AC 1 phase, or DC supply type. The user may also choose one of the voltage type radio buttons 310 to select between a single supply voltage and the ranged supply voltage as defined by the present invention.

The user selects values for the lower nominal voltage field 320 and the upper nominal voltage field 340 based on the intended applications for the motor control system 100. For example, if the motor control system 100 is a 3 phase system to be used in the United States and Europe, the lower nominal voltage field 320 may be specified as 400V (Europe) and the upper nominal voltage field 340 may be specified as 480V (US). The user may manually enter the values or select values from a predetermined drop down list of choices. The user may also select values for the lower tolerance field 330 and upper tolerance field 350 as appropriate.

Returning to FIG. 2, based on the voltage range selections defined by the user using the application requirements interface 230, the motion analyzer engine 220 determines an upper voltage limit based the specified upper nominal voltage field 340 and upper tolerance field 350 (e.g., 480V+10%=528) and a lower voltage limit based on the specified lower nominal voltage field 320 and lower tolerance field 330 (e.g., 400V−10%=360V. The motion analyzer engine 220 evaluates the motor control system 100 using the upper and lower voltage limits to determine its operation requirements. The motion analyzer engine 220 evaluates a first performance measure (i.e., regenerative loading) based on the upper voltage limit and a second performance measure (i.e., velocity performance) based on the lower voltage limit. Specific techniques for determining the performance measures are well known to those of ordinary skill in the art. By basing the first performance measure on the value in the upper nominal voltage field 340 and the second performance measure on the value in the lower nominal voltage field 320, the motion analyzer engine 220 is able to identify components in the equipment database 240 that are suitable for both applications. The motion analyzer engine 220 may also determine by calculation or comparison between application requirement data and system specification data, performance parameters, such as, but not limited to, average shaft power, peak shaft power, average current, peak current, average dump power, critical velocity segment number, peak bus voltage needed, critical segment current, critical dump segment, critical dump power, and critical dump time. The motion analyzer engine 220 may also determine performance measures for the gearbox 160, such as RMS output torque, peak output torque, peak input velocity, output power, power losses, and coupler minimum stiffness.

In selecting suggested compositions for the motor control system 100, and the motion analyzer engine 220 may also compare the voltage range specified by the lower nominal voltage field 320 and upper nominal voltage field 340 to individual voltage ratings specified for each of the individual components in the equipment database 240 to verify their suitability.

Generally, the motion analyzer engine 220 identifies suitable components by determining the performance measures for different motor/amplifier/gearbox combinations. The motion analyzer engine 220 may limit its solution search based on search preferences specified by the user. For example, the user may restrict the solutions to a particular drive family. In light of any such user restrictions, the motion analyzer engine 220 evaluates possible motor/amplifier/gearbox combinations and determines performance parameters for each combination. Subsequently, the motion analyzer engine 220 scores each potential configuration and selects a rating of pass, caution, near fail, or far fail.

Figure 4:
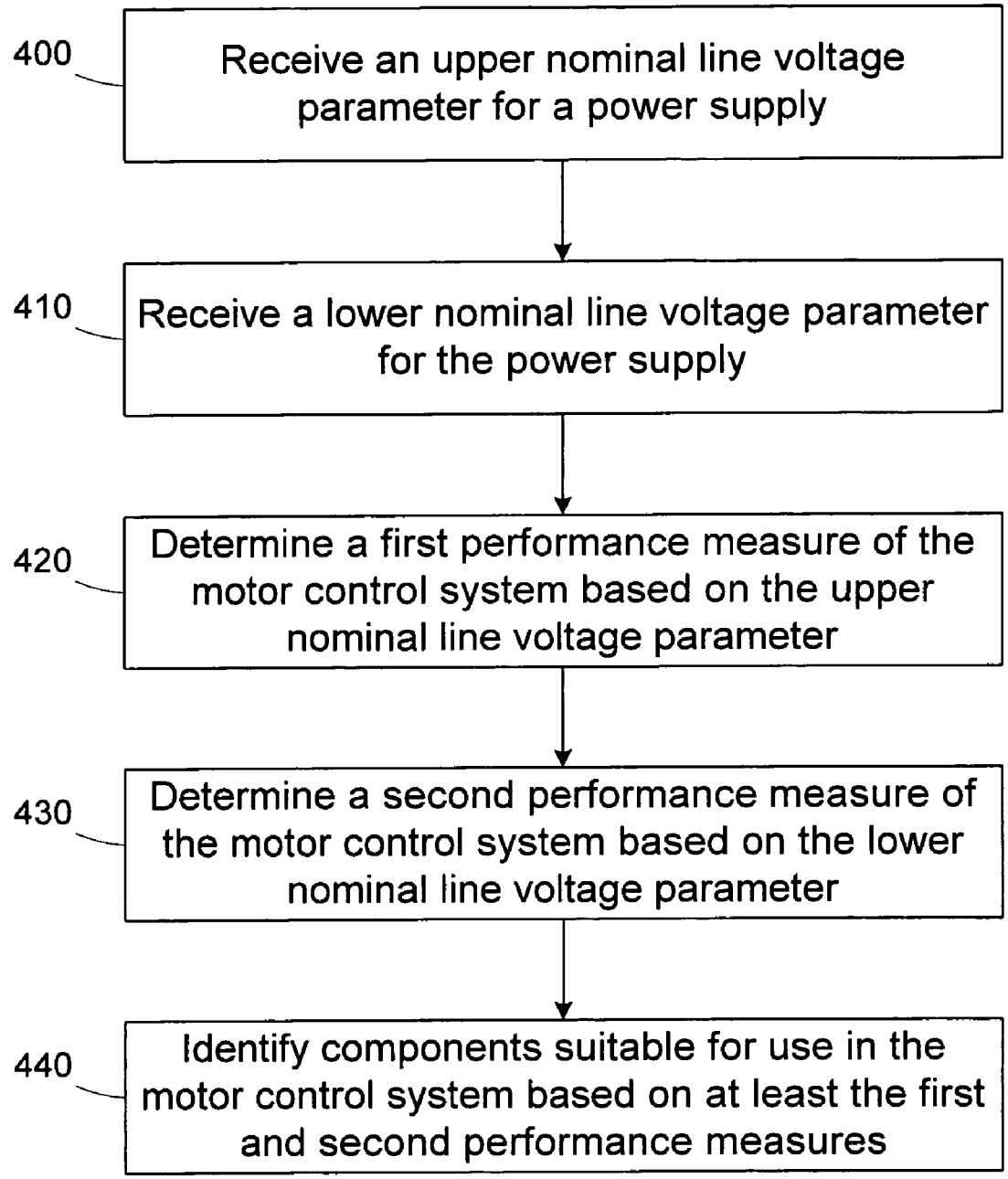
FIGS. 4 and 5 are simplified flow diagrams of a method for sizing components in a motor control system in accordance with another illustrative embodiment of the present invention.

Turning now to FIG. 4, a simplified flow diagram of a method for sizing components in a motor control system in accordance with another illustrative embodiment of the present invention is shown. Although the method of FIG. 4 is illustrated as being linear, various steps may be performed in different orders or in parallel, and the method may be iterative.

In block 400 an upper nominal line voltage parameter for the power supply 110 is received. In block 410, a lower nominal line voltage parameter for the power supply 110 is received. In block 420, a first performance measure (e.g., regenerative loading) of the motor control system 100 is determined based on the upper nominal line voltage parameter. In block 430, a second performance measure (e.g., velocity performance) of the motor control system 100 is determined based on the lower nominal line voltage parameter. In block 440, components suitable for use in the motor control system 100 are identified based on at least the first and second performance measures.

Figure 5:
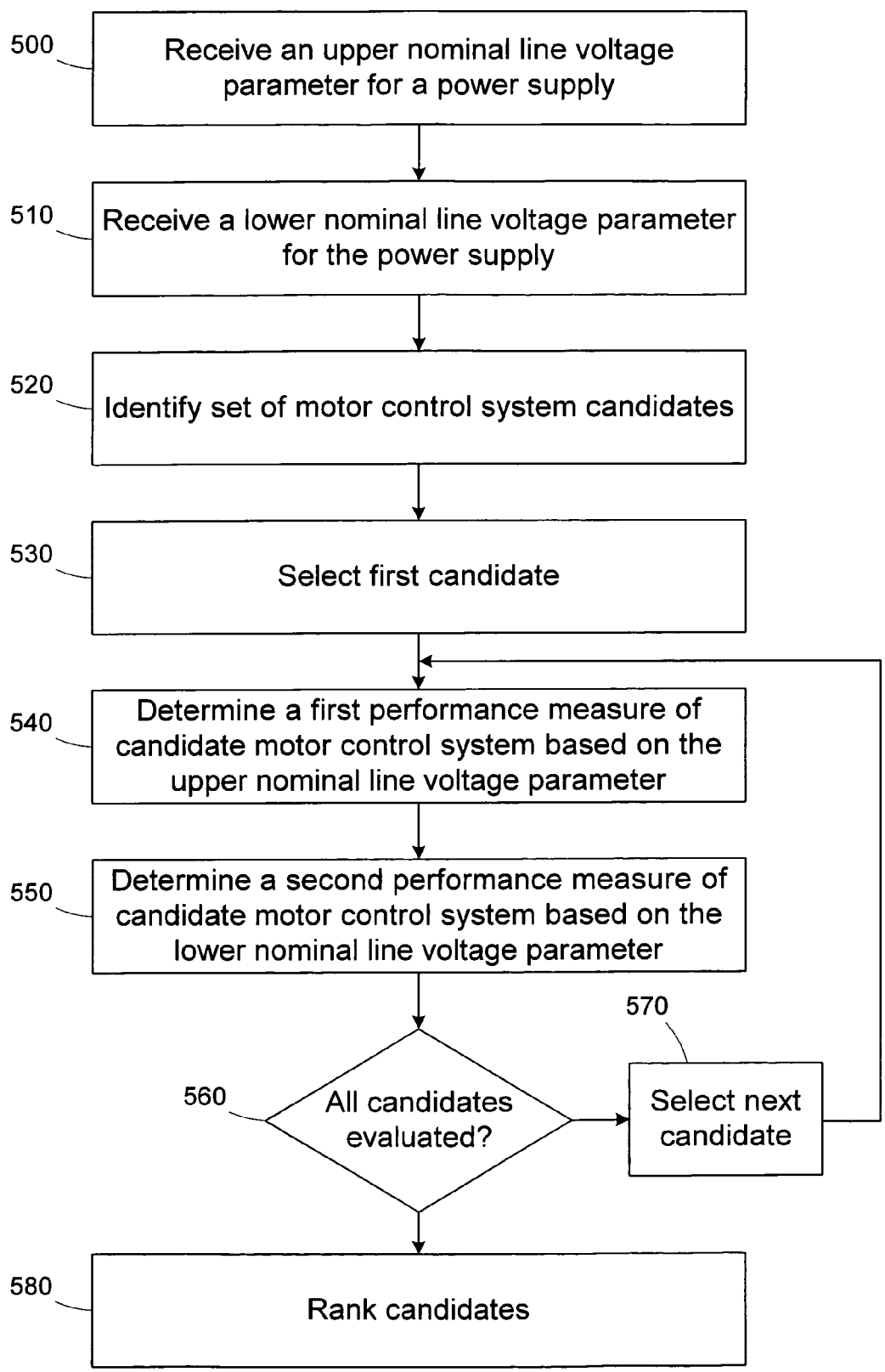

In identifying the suitable components in block 440, the previous steps may be repeated in an iterative fashion for multiple motor control system arrangements. FIG. 5, illustrates such an iterative example. The upper and lower nominal line voltages are received in blocks 500 and 510, respectively, as described above in blocks 400 and 410 of FIG. 4. In block 520, a set of motor control system candidates is identified. The set may contain different amplifier/motor/gearbox combinations, and may be limited as specified by a user. The first candidate is selected in block 530. In blocks 540 and 550, the first and second performance measures are determined for the selected candidate. In block 560, a determination is made as to whether all candidates have been evaluated. If not, the next candidate is selected in block 570, and the performance measures are calculated for the next candidate in blocks 540 and 550. If all candidates have been evaluated in block 560, the candidates are ranked (e.g., pass, caution, near fail, or far fail) in block 580. Based on the ranked candidates, the user may identify system configurations suitable for use with both nominal line voltages specified.

Allowing the specification of multiple nominal line voltages, and identifying components suitable for use across the specified range of nominal line voltages, as described herein, simplifies the design process. Multiple analyses need not be performed for each application with a different nominal line voltage, and the time consuming process of manually cross-referencing the multiple analyses and determining system compromises may be avoided.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A computer-implemented method for sizing components of a motor control system configured to be powered by each of a first and second power supply, the method comprising:
   receiving a first nominal line voltage parameter for the first power supply;
   receiving a second nominal line voltage parameter for the second power supply, wherein the second nominal line voltage parameter is different from the first nominal line voltage parameter;
   determining a first performance measure of the motor control system based on the first nominal line voltage parameter;
   determining a second performance measure of the motor control system based on the second nominal line voltage parameter; identifying components, using the first and second performance measures, that are configured for use in the motor control system when powered by each of a first and second power supply; and
   wherein the number of performance measures used to identify components that are configured for use in the motor control system is only equal to the number of power supplies for use with the motor control system.

2. The method of claim 1, wherein determining the first performance measure further comprises determining a regenerative load parameter of the motor control system.

3. The method of claim 1, wherein determining the second performance measure further comprises determining a velocity performance parameter of the motor control system.

4. The method of claim 1, further comprising receiving a first tolerance parameter, wherein determining the first performance measure further comprises determining the first performance measure of the motor control system based on the first nominal line voltage parameter and the first tolerance parameter.

5. The method of claim 4, further comprising receiving a second tolerance parameter, wherein determining the second performance measure further comprises determining the second performance measure of the motor control system based on the second nominal line voltage parameter and the second tolerance parameter.

6. The method of claim 1, further comprising:
   identifying a set of candidate motor control system arrangements;
   determining the first and second performance measures for each of the candidate motor control system arrangements; and
   ranking the set of candidate motor control system arrangements based on the first and second performance measures associated with each candidate.

7. A program storage device having processor readable code embodied thereon that, when executed by a processing device, size components of a motor control system powered by a power supply by:
   receiving a first nominal line voltage for the power supply;
   receiving a second nominal line voltage for the power supply;
   determining a first performance measure of the motor control system based on the first nominal line voltage;
   determining a second performance measure of the motor control system based on the second nominal line voltage;
   identifying components suitable for use in the motor control system at both the first and second nominal line voltages based on at least the first and second performance measures; and
   wherein the number of performance measures used to identify components suitable for use in the motor control system is only equal to the number of nominal line voltage for use with the power supply.

8. The program storage device of claim 7, wherein determining the first performance measure in the method further comprises determining a regenerative load parameter of the motor control system.

9. The program storage device of claim 7, wherein determining the second performance measure in the method further comprises determining a velocity performance parameter of the motor control system.

10. The program storage device of claim 7, wherein the method further comprises:
    receiving a first tolerance parameter; and
    determining the first performance measure of the motor control system based on the first nominal line voltage and the first tolerance parameter.

11. The program storage device of claim 10, wherein the method further comprises:
    receiving a second tolerance parameter; and
    determining the second performance measure of the motor control system based on the second nominal line voltage and the second tolerance parameter.

12. The program storage device of claim 7, wherein the method further comprises:

identifying a set of candidate motor control system arrangements;

determining the first and second performance measures for each of the candidate motor control system arrangements; and ranking the set of candidate motor control system arrangements based on the first and second performance measures associated with each candidate.

13. A sizing tool implemented on an electronic computer for sizing components of a motor control system powered by a power supply, comprising:

a component database;

an application requirements interface including a first field specifying a first nominal line voltage parameter for the power supply and a second field specifying a second nominal line voltage parameter for the power supply;

a motion analyzer engine operable to determine a first performance measure of the motor control system based on the first nominal line voltage parameter, determine a second performance measure of the motor control system based on the second nominal line voltage parameter, and based on at least the first and second performance measures, identify components in the component database suitable for use in the motor control system for both the first and second nominal line voltage parameters; and wherein the number of performance measures used to identify components in the component database suitable for use in the motor control system is not more than the number of nominal line voltage for use with the power supply.

14. The sizing tool of claim 13, wherein the first performance parameter comprises a regenerative load parameter of the motor control system.

15. The sizing tool of claim 13, wherein the second performance parameter comprises a velocity performance parameter of the motor control system.

16. The sizing tool of claim 13, wherein the application requirements interface includes a third field specifying a first tolerance parameter, and the motion analyzer engine is operable to determine the first performance measure of the motor control system based on the first nominal line voltage parameter and the second tolerance parameter.

17. The sizing tool of claim 16, wherein the application requirements interface includes a fourth field specifying a second tolerance parameter, and the motion analyzer engine is operable to determine the second performance measure of the motor control system based on the second nominal line voltage parameter and the second tolerance parameter.

18. The sizing tool of claim 13, wherein the motion analyzer engine is further operable to identify a set of candidate motor control system arrangements, determine the first and second performance measures for each of the candidate motor control system arrangements, and rank the set of candidate motor control system arrangements based on the first and second performance measures associated with each candidate.

19. The method of claim 1, wherein identifying components suitable for use in the motor control system further comprises:

calculating a voltage range specified by the first nominal line voltage parameter and the second nominal line voltage parameter; and comparing the voltage range to voltage ratings for a plurality of components; and based on the comparison, identifying at least one of the plurality of components as being suitable for use in the motor control system.

20. The method of claim 1, wherein only the first and second performance measures are used to identify components that are configured for use in the motor control system when powered by each of a first and second power supply.

* * * * *